July 26, 1932. B. F. REYNOLDS 1,868,766
PNEUMATIC TIRE PUMP CONTROL
Filed Sept. 20, 1930
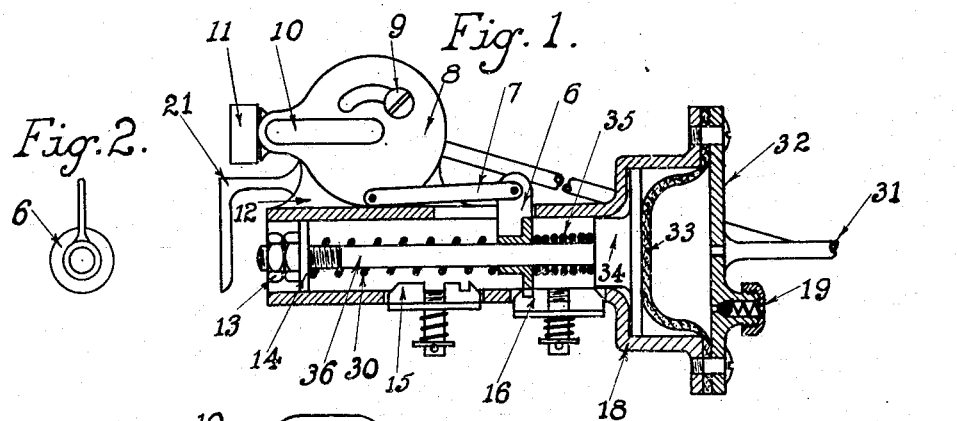
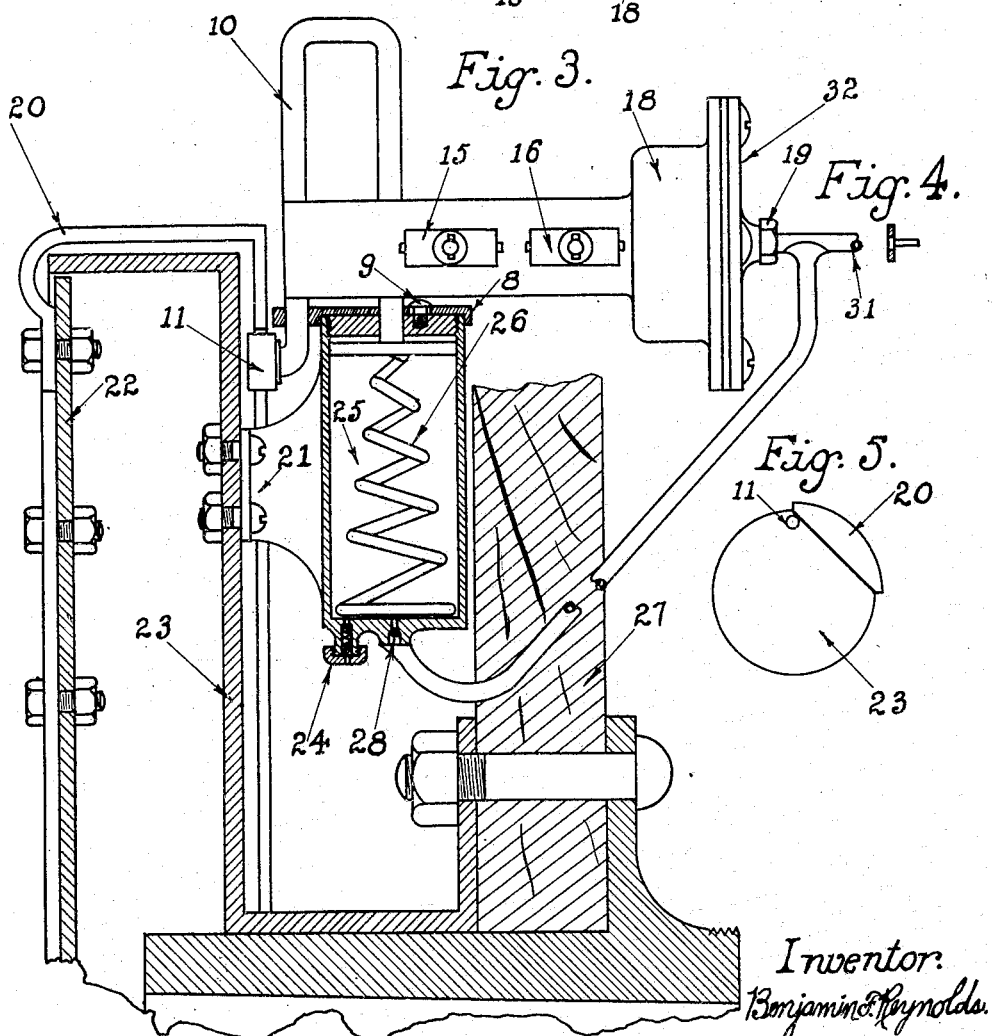
Inventor:
Benjamin F. Reynolds.

Patented July 26, 1932

1,868,766

UNITED STATES PATENT OFFICE

BENJAMIN F. REYNOLDS, OF STOCKTON, CALIFORNIA

PNEUMATIC TIRE PUMP CONTROL

Application filed September 20, 1930. Serial No. 483,333.

The object of the invention is to keep pneumatic tires inflated properly at all times, thus improving the riding and wearing qualities. Also to eliminate the time and trouble required to inflate them in the ordinary manner. This is accomplished automatically, when the wheel turns, in the ordinary course of travel, by the changes in tire pressure operating on a piston and springs, which in turn move an air pump, in or out of operating position, as required.

One form of the invention is illustrated in the accompanying drawing, in which Fig. 1 is a plan view as it would appear from a point on the circumference of the wheel looking toward the center of the hub; Fig. 2, a projection of the spacer 6; Fig. 3, illustrates the method of mounting on the brake drum; Fig. 4, a projection of the spacer stop 15; and Fig. 5 shows the relative positions of 20 and 11 when in pumping position.

As shown in Fig. 3, the wheel 27 and brake drum 23 rotate the cylinder 25, which is connected by the bracket 21 to the brake drum 23, at right angles to the center of rotation. The roller 11 follows the bracket 20, which is rigidly mounted on the chasis, forcing the piston and rod 10 down at the same time compressing air in the cylinder 25 and forcing air through the check valve 28 to the tube 31. As the roller 11 leaves the bracket 20, the spring 26 forces the piston and rod 10 back drawing air into the cylinder 25 through the valve 24.

The tube 31 is connected to the valve stem of the tire at a point below the valve. Thus the air pressure on the rubber diaphragm 33 is equal to the air pressure in the tire. This pressure stretches the diaphragm 33 forcing the piston 34 to the position shown in Fig. 1, at the same time compressing the spring 35 and allowing the spring 30 to expand. The pressure required to compress the spring 35 to the position shown should equal the maximum tire pressure desired. At this point the stop 16 has been raised by the shoulder on the piston 34 sliding under the bevelled end of the stop 16. This releases the spacer 6 and the spring 35 expands moving the spacer 6 to the notch in the stop 15 as the spring 30 is compressed. At the same time the connecting link 7 rotates the disk 8 throwing the roller 11 out of contact with the bracket 20 thus interrupting action of the piston and rod 10.

As pressure in the tire falls pressure on the diaphragm 33 falls also allowing the spring 35 to force the piston 34 toward the cylinder head 32. The piston 34 through the rod 36 drags the secondary piston 14 with it compressing the spring 30 as the spring 35 expands. 14 is dragged under the bevelled end of the stop 15, the spacer 6 is released and the spring 30 expands moving the spacer 6 to the notch in the stop 16 as the spring 35 is compressed. At the same time the connecting link 7 rotates the disk 8 throwing the roller 11 in contact with the bracket 20 thus resuming action of the piston and rod 10.

The screw 9, as shown in Fig. 1, holds the disk 8 in position and also acts as a stop when the disk 8 rotates.

12 is merely a fin connecting the pump cylinder 25 to the pressure control cylinder 18.

A safety valve 19, shown in Fig. 1, operates only in case the pressure in the tire becomes excessive, from air expansion or failure of the mechanism.

The nut 13 is merely a lock for the secondary piston 14.

The spring 30 should be designed with coils of a constant pitch, thus having a uniform ratio of deflection for pressure applied. For example a pressure of 25 pounds should be obtained when deflected to a length of 1½ inches, 30 pounds for a length of 1 inch, and 35 pounds for a length of ½ inch. While the spring 35 should be designed with coils of a variable pitch suitable to obtain a pressure of 25 pounds when deflected to a length of 1½ inches, 30 pounds for a length of 1 inch, and 40 pounds for a length of ½ inch.

I claim:

1. A tire pump control structure, said pump having a piston, said structure comprising means to depress the piston comprising a rod bearing on said piston, a roller supported by the rod to one side of the same, and a cam to engage the roller and depress the rod during the relative rotation of the pump and cam when said roller occupies a certain radial position relative to the pump; and means actuated by air pressure in the tire in excess of a predetermined amount for rotating the rod to move the roller out of the path of the cam.

2. A tire pump control structure comprising, with the cylinder and piston of the pump, a rod extending axially of the cylinder and bearing on the piston, a disk turnably mounted on the cylinder through which the rod slidably but non-turnably projects, a roller carried by the rod to one side of the same, a relatively fixed cam to engage the roller and depress the rod when the roller occupies a certain radial position relative to the cylinder, means applied to the disk to normally hold the same so that the roller is disposed in such position, and air-pressure actuated means applied to said holding means to cause the disk to turn and move the roller out of the path of the cam when the air pressure in the tire exceeds a predetermined amount.

3. A tire pump control structure comprising means to operate the pump said means including a cam, and a roller to be engaged and depressed by the cam with the rotation thereof, means mounting said roller for swinging movement into and out of the plane of the cam, an air cylinder mounted with the pump and adapted at one end for connection to a tire, a piston in said cylinder, spring means to move the piston in opposition to the air pressure and arranged to be overcome by a pressure in excess of a predetermined amount, and means between the piston and said roller mounting means for holding the roller in a cam engaging position when the piston is moved by the spring means, and for swinging the roller clear of the cam when the spring means is overcome by the air pressure.

4. A tire pump control structure comprising means to operate the pump, said means including a cam, and a roller to be engaged and depressed by the cam with the rotation thereof; means mounting said roller for swinging movement into and out of the plane of the cam, means applied to the roller mounting means for normally holding the roller in a cam engaging position, and means included in part with said last named means for swinging the roller clear of the cam when the air pressure in the tire exceeds a predetermined amount.

5. A tire pump control structure comprising means to operate the pump, said means including a cam, and a roller to be engaged and depressed by the cam with the rotation thereof; means mounting said roller for swinging movement into and out of the plane of the cam, an air cylinder mounted with the pump and connected at one end to the tire, a piston in said cylinder, a rod on said piston extending away from the tire connected end of the cylinder, a member slidable on the rod, a connection between said member and the roller mounting means to cause the roller to be swung in one direction or the other with the movement of the member along the rod, compression springs on the rod on opposite sides of and bearing at one end against the member, separate stops to hold the member against movement at predetermined positions relative to the rod and cylinder, and means associated with the piston and stops to alternately release the latter from engagement with the member with the movement of the piston along the cylinder in opposite directions.

6. A tire pump control structure comprising means to operate the pump, said means including a cam, and a roller to be engaged and depressed by the cam with the rotation thereof; means mounting said roller for swinging movement into and out of the plane of the cam, an air cylinder mounted with the pump and connected at one end to the tire, a piston in said cylinder, a rod on said piston extending away from the tire connected end of the cylinder, a member slidable on the rod, a connection between said member and the roller mounting means to cause the roller to be swung in one direction or the other with the movement of the member along the rod, means acting on the member to move the same in one direction when the piston is moved by air pressure, and means to move the piston and also the member in the opposite direction when the air pressure is below a predetermined maximum.

7. A structure as in claim 13, with spring advanced stops spaced lengthwise of and projecting into the cylinder to engage and hold the member at its opposite limits of movement; one stop being arranged to be depressed clear of the member by the movement of the piston as imparted thereto by the air pressure, and an element mounted in connection with the piston rod to depress the other stop with the movement of the piston in the opposite direction.

8. A tire pump control structure, said pump having a piston, said structure comprising means to depress the piston including a member mounted in connection therewith, a cam to engage the member and move the same in a piston depressing direction during the relative rotation of the pump and cam; and means actuated by air pressure in the tire in excess of a predetermined amount for moving said member laterally and clear of the cam.

BENJAMIN F. REYNOLDS.